United States Patent
Amarilio et al.

(10) Patent No.: US 11,893,309 B2
(45) Date of Patent: Feb. 6, 2024

(54) CONDITIONALLY ASSIGNING VARIOUS AUTOMATED ASSISTANT FUNCTION(S) TO INTERACTION WITH A PERIPHERAL ASSISTANT CONTROL DEVICE

(71) Applicant: GOOGLE LLC, Mountain View, CA (US)

(72) Inventors: Tomer Amarilio, Palo Alto, CA (US); Yuzhao Ni, Sunnyvale, CA (US); Bryan Allen, Emeryville, CA (US); Norbert Tydingco, Brentwood, CA (US); Will Donnelly, Sunnyvale, CA (US); Feng Yuan, Sunnyvale, CA (US); Nathaniel Nesiba, Mountain View, CA (US); Anurag Jain, Palo Alto, CA (US); Jacky Cheung, Palo Alto, CA (US); Ronghui Zhu, San Jose, CA (US); Chunya Hua, San Jose, CA (US); Gregory Kielian, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 13 days.

(21) Appl. No.: 17/691,889

(22) Filed: Mar. 10, 2022

(65) Prior Publication Data

US 2022/0197593 A1 Jun. 23, 2022

Related U.S. Application Data

(63) Continuation of application No. 16/610,815, filed as application No. PCT/US2019/016366 on Feb. 1, 2019, now Pat. No. 11,275,553.

(Continued)

(51) Int. Cl.
G06F 3/16 (2006.01)
G10L 15/08 (2006.01)
G10L 15/22 (2006.01)

(52) U.S. Cl.
CPC .............. *G06F 3/167* (2013.01); *G10L 15/08* (2013.01); *G10L 15/22* (2013.01); *G06F 2221/2111* (2013.01); *G10L 2015/223* (2013.01)

(58) Field of Classification Search
CPC .............. G06F 3/167; G06F 2221/2111; G10L 2015/223; G10L 15/22; G10L 15/08
See application file for complete search history.

(56) References Cited

U.S. PATENT DOCUMENTS 7,920,678 B2 4/2011 Cooper et al.
9,299,350 B1 3/2016 Dumont et al.
(Continued)

FOREIGN PATENT DOCUMENTS

GB 2574471 A * 12/2019 ............. G06F 3/167
WO 2019234392 12/2019

OTHER PUBLICATIONS

India Intellectual Property; Examination Report issued in Application No. IN 202027053831; 7 pages; dated Jan. 10, 2022.
(Continued)

*Primary Examiner* — Brian L Albertalli
(74) *Attorney, Agent, or Firm* — Gray Ice Higdon

(57) ABSTRACT

In response to a user interacting with a tangible peripheral assistant control device (e.g., depressing a button of the device), causing an automated assistant to perform one or more actions. The action(s) performed can be based on input previously provided by the user in configuring the peripheral assistant control device. The action(s) performed in response to interaction with the peripheral assistant control device can
(Continued)

vary based on one or more conditions, such as which user is currently active, where the peripheral assistant control device is currently located (which can optionally be inferred based on which of multiple assistant computing devices the button is paired with), and/or the current state of one or more smart devices and/or other devices (e.g., as determined based on a device topology). A utility of the peripheral assistant control device can be automatically extended beyond what was specifically requested by a user during configuration.

15 Claims, 8 Drawing Sheets

Related U.S. Application Data

(60) Provisional application No. 62/776,979, filed on Dec. 7, 2018.

(56) References Cited

U.S. PATENT DOCUMENTS

| | | |
|---|---|---|
| 9,635,164 B2 | 4/2017 | Smith et al. |
| 10,466,963 B2 | 11/2019 | Levi et al. |
| 10,802,848 B2 | 10/2020 | Liu et al. |
| 11,024,304 B1 | 6/2021 | Smith |
| 11,275,553 B2 | 3/2022 | Amarilio et al. |
| 2012/0265528 A1 | 10/2012 | Gruber et al. |
| 2014/0052681 A1 | 2/2014 | Nitz et al. |
| 2015/0019342 A1 | 1/2015 | Gupta |
| 2015/0312398 A1 | 10/2015 | Li |
| 2016/0034249 A1 | 2/2016 | Lee et al. |
| 2018/0061403 A1 | 3/2018 | Devaraj et al. |
| 2018/0113672 A1 | 4/2018 | Klein et al. |
| 2018/0210700 A1 | 7/2018 | Roman et al. |
| 2018/0233147 A1 | 8/2018 | Tukka et al. |
| 2018/0342243 A1 | 11/2018 | VanBlon et al. |
| 2019/0020761 A1 | 1/2019 | Golden et al. |
| 2019/0139542 A1 | 5/2019 | Gunther |
| 2019/0348040 A1 | 11/2019 | Mann et al. |
| 2021/0118438 A1* | 4/2021 | Clarke ............... G06F 3/167 |

OTHER PUBLICATIONS

International Search Report and Written Opinion issued is Application No. PCT/US2019/016366 dated Aug. 9, 2019.

European Patent Office; Communication pursuant to Article 94(3) issued in Application No. 19706094.0, 18 pages, dated Jul. 5, 2022.

* cited by examiner

CONDITIONALLY ASSIGNING VARIOUS AUTOMATED ASSISTANT FUNCTION(S) TO INTERACTION WITH A PERIPHERAL ASSISTANT CONTROL DEVICE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

In many cases, users provide spoken utterances to cause an automated assistant to perform various actions. However, extensive computational and/or network resources can be utilized in processing spoken utterances to perform automated assistant actions. For instance, an automated assistant action of turning on a smart light can be accomplished by transmitting a corresponding command to the smart light directly, or to a third-party server that processes the command, then transmits a corresponding command to the smart light. However, in performing such an action in response to a spoken utterance of "Assistant, turn on smart light X", speech-to-text processing is performed on audio data that captures the spoken utterance, natural language processing is performed based on the resulting text, and then the corresponding command is determined. Further, where speech-to-text and/or natural language processing is performed remotely, audio data and/or other data will need to be transmitted over one or more networks.

SUMMARY

Implementations set forth herein relate to causing an automated assistant to perform one or more actions responsive to a user interacting with a peripheral assistant control device. The peripheral assistant control device can be paired (e.g., via Bluetooth or other communications protocol) with an assistant computing device that includes an automated assistant interface and that alone and/or through interaction with remote automated assistant components, enables performance of various automated assistant functions. In response to user interaction with the peripheral assistant control device, output can be provided by the peripheral assistant control device to the paired assistant computing device. In response to receiving the output, the paired assistant computing device can initiate the performance of one or more automated assistant actions/functions. Implementations described herein may serve to increase the utility of peripheral assistant control devices such that fewer peripheral assistant control devices may be required to enable performance of a given number of automated assistant functions. In addition, some implementations may facilitate/reduce the complexity of configuration of the peripheral assistant control devices. Furthermore, since the peripheral assistant control devices may reduce the amount of speech recognition processing (and associated bandwidth usage etc.) that is required by the automated assistant system, increasing the utility/functionality of the peripheral assistant control devices may serve to further reduce the processing, bandwidth etc. that is utilized by the automated assistant system as a whole.

As described herein, the automated assistant action(s) performed can be based on user interface input previously provided by the user in configuring the peripheral assistant control device. Moreover, the action(s) performed can vary in dependence on one or more conditions, such as which of multiple users is determined to be currently active, where the peripheral assistant control device is currently located (which can optionally be inferred based on which of multiple assistant computing devices the peripheral assistant control device is paired with), and/or the current state of one or more smart devices and/or other devices (e.g., as determined based on a device topology). As also described herein, the automated assistant action(s) performed can include one or more actions that extend beyond action(s) that were specifically requested by a user during configuration of the peripheral assistant control device.

The peripheral assistant control device itself can lack direct access to an automated assistant, and may lack, or contain less powerful versions of, various hardware resources that are present on the paired assistant computing device. For example, the peripheral assistant control device can lack a microphone and a Wi-Fi module, whereas the paired assistant computing device includes both. Further, while the peripheral assistant control device can include a processor, it can be less powerful than processor(s) included at the paired assistant computing device. In some implementations, the peripheral assistant control device can include a virtual button provided at a graphical user interface, and/or any other interface capable of presenting a virtual button. Alternatively, or additionally, the peripheral assistant control device can include a physical button with one or more user interfaces through which a user can provide one or more different inputs. The one or more different inputs can cause the peripheral assistant control device to provide, over a wireless communications channel, one or more different outputs, respectively.

One or more users can provide user interface input to configure a peripheral assistant control device. For example, user interface input can be provided at an assistant computing device and/or at the peripheral assistant control device to initially pair the assistant computing device and the peripheral assistant control device. Further user interface input can be provided to explicitly assign certain automated assistant function(s) to an interaction with the peripheral assistant control device. For example, a user can provide a spoken utterance of "Assistant, when I push this button turn on the living room lights". In various implementations, although the user only specifies certain automated assistant function(s) to be assigned to interaction with the peripheral assistant control device, one or more additional automated assistant function(s) can be further automatically suggested (and assigned if affirmative user interface input received), or further automatically assigned (without first suggesting).

As one example, for the spoken utterance of "Assistant, when I push this button turn on the living room lights" the automated assistant action of causing an on/off property of the "living room" lights to be commanded to an "on" state is explicitly indicated by the spoken utterance and, as a result, can be assigned to the peripheral assistant control device. Although not explicitly indicated by the spoken utterance, the further automated assistant function of causing an on/off property of the "living room" lights to be commanded to an "off" state can be further assigned. Further, causing an on/off property of the "living room" lights to be commanded to an "on" state can be further assigned to a first condition of the on/off property of the "living room" lights being in an "off" state—and causing an on/off property of the "living room" lights to be commanded to an "off" state can be further assigned to a second condition of the on/off property of the "living room" lights being in an "on" state. Thus, in response to receiving output from the peripheral assistant control device in response to an interaction, a current state of the on/off property of the "living room" lights can be determined (e.g., by querying the lights and/or using a device topology (with recently updated device states)), and the lights commanded to either the on state or the off state, in dependence on whether the current condition is the first condition or the second condition.

As another example, for the spoken utterance of "Assistant, when I push this button play some bluegrass music" the automated assistant action of causing the paired assistant computing device (and/or other device(s), if specified) to play "bluegrass music" is explicitly indicated by the spoken utterance and, as a result, can be assigned to the peripheral assistant control device. Although not explicitly indicated by the spoken utterance, the further automated assistant function of causing a currently playing "bluegrass song" to be replaced by playing of another "bluegrass song" (e.g., a "next song" automated assistant function) can be further assigned. Further, the play "bluegrass music" automated assistant function can be further assigned to a first condition of the assistant computing device not currently rendering "bluegrass music" (or, optionally, not rendering any music) and the "next song" automated assistant function can be further assigned to a second condition of "bluegrass music" (or, optionally, any music) being currently rendered at the assistant computing device. Thus, in response to receiving output from the peripheral assistant control device in response to an interaction, the play "bluegrass music" automated assistant function can be initiated by the assistant computing device if the first condition is satisfied, whereas the "next song" automated assistant function can instead be initiated by the assistant computing device if the second condition is satisfied.

Accordingly, even though a user can provide the same user interaction (e.g., a button press) at the peripheral assistant control device on two separate occasions, and the same output transmitted from the peripheral assistant control device to a paired assistant computing device in response, different automated assistant functions can resultantly occur at the two separate occasions, due to different conditions at the two separate occasions.

Automatically suggesting and/or automatically assigning one or more additional automated assistant function(s) to the peripheral assistant control device results in various technical benefits. For example, it enables the additional automated assistant functions to be performed responsive to certain user interactions with the peripheral automated assistant device. The additional automated assistant functions can be performed responsive to receiving the output provided by the peripheral automated assistant device, and determining certain condition(s) are satisfied—which can be significantly more efficient (computationally and/or network wise) than processing a corresponding spoken utterance. Also, for example, it can reduce an amount of user input that would otherwise be required by the user to explicitly assign the additional automated assistant functions. Moreover, automatically altering, in dependence on a current condition, the automated assistant function that is initiated responsive to receiving output from the peripheral assistant control device also results in various technical benefits. For example, initiating the correct automated assistant function for the current condition ensures that processor and/or network resources utilized to perform that automated assistant function are not wasted. For instance, techniques that do not initiate different automated assistant functions for different conditions can wastefully generate and transmit commands that are duplicative and will be ignored (e.g., generating and transmitting a "turn lights on" command even though they are already "on").

In some additional and/or alternative implementations, different automated assistant functions can be assigned to the same interaction with the peripheral automated assistant control device, and which of the automated assistant functions is imitated in response to a given instance of the interaction can depend on where the peripheral assistant control device is currently located. For example, first automated assistant function(s) of turning on and/or off the "living room" lights can be initiated when the peripheral assistant control device is located in or near the "living room", whereas a second automated assistant function of "play some music on basement devices" can be initiated when the peripheral assistant control device is located in or near the "basement". Various techniques can be utilized to determine where the device is currently located. For example, where the device is currently located can be based on which of multiple assistant computing devices the button is currently paired with. The pairing of the peripheral assistant control device can be switched between different assistant computing devices responsive to user interface input (at the respective assistant computing device and/or at the peripheral assistant control device), or can be automatically switched so as to pair with the assistant computing device having the strongest (or only detectable) communications signal (e.g., Bluetooth) with the peripheral assistant control device.

In some implementations, explicit user interface input can be provided that indicates which automated assistant function(s) should be performed for which locations of the peripheral assistant control device. For example, the user can provide a spoken utterance such as, "Assistant, when the interface device is in the living room, have it control the television, but when the interface device is in the kitchen, have it control playback of podcasts." In response, the automated assistant can establish corresponding configuration settings for the peripheral assistant control device. For example, using data that is indicative of a location of the peripheral assistant control device, the automated assistant can correlate an output of the peripheral assistant control device to a particular function based on where the peripheral assistant control device is indicated to be located. For example, the peripheral assistant control device can be determined to be in the "living room" based on it being paired with an automated assistant computing device that is assigned, in a device topology, to a "living room" location. Additional and/or alternative techniques can be utilized to determine location of the peripheral assistant control device, such as techniques that determine the location based on network strength data, data from another device that the peripheral assistant control device is paired with or otherwise in communication with, data identifying a particular device that the peripheral assistant control device is paired with or otherwise in communication with, elevation data, motion data, audio data, image data, and/or any other data from which a location of a device can be determined.

In some implementations, user interface input can specify an automated assistant function of control of a type of smart device, and can specify that it is be assigned to the peripheral assistant control device. However, the user interface input may not specify the particular smart devices to be controlled. For example, the user can provide a spoken utterance such as, "Assistant, have the interface device control turn the lights on and off for the room it is in". In some of those implementations, particular automated assistant function(s) can be assigned, that are each directed to control of one or more particular smart devices of the type, and that are each associated with a corresponding condition (such as location of the peripheral assistant control device). For example, a first automated assistant function of turning on/off the "living room" lights can be assigned to a first condition of the peripheral assistant control device being in the "living room", and a second automated assistant function of turning on/off the "kitchen" lights can be assigned to a second condition of the peripheral assistant control device being in the "kitchen". When the peripheral assistant control device is determined to be in the "kitchen" (e.g., based on being paired with a "kitchen" assistant computing device), output received responsive to interaction with the peripheral assistant control device can cause control of the on/off state of lights that are also assigned to the "kitchen" (e.g., in a device topology). On the other hand, when the peripheral assistant control device is determined to be in the "living room" (e.g., based on being paired with a "living room" assistant computing device), output received responsive to interaction with the peripheral assistant control device can cause control of the on/off state of lights that are also assigned to the "living room" (e.g., in a device topology).

Assigning different automated assistant functions in dependence on where the peripheral assistant control device is currently located results in various technical benefits. For example, it enables the functionality of the peripheral assistant control device to be dynamically adapted based on location, without necessitating that a user provide resource consuming further interface input to explicitly reconfigure the functionality each time the peripheral assistant control device is moved. Also, for example, it enables a single peripheral assistant control device, and optionally a single interaction, to have multiple functionalities in dependence on location—thus obviating the need for multiple separate peripheral assistant control devices for the multiple functionalities.

In some additional and/or alternative implementations, different automated assistant functions can be assigned to the same interaction with the peripheral automated assistant control device, and which of the automated assistant functions is imitated in response to a given instance of the interaction can depend on which of multiple users is currently an active user. For example, a first automated assistant function(s) of turning on and/or off the "living room" lights can be initiated when a first user is an active user, whereas second automated assistant function(s) of "play some music" can be initiated when a second user is an active user. Various techniques can be utilized to determine which of multiple users is currently an active user. For example, the user that most recently interacted with an assistant computing device with which the peripheral assistant control device is paired, can be considered the currently active user (optionally contingent on that recent interaction being within the last 5 minutes, or within another time threshold). A particular user can be determined to have interacted with an assistant computing device based on verifying that user based on, for example, matching spoken input from the interaction with a stored speaker embedding for the user. Additional and/or alternative verification techniques can be utilized, such as a user provided pin, user provided passphrase, and/or other biometric identification techniques (with permission from a corresponding user).

Assigning different automated assistant functions in dependence on which user is a currently active user of the peripheral assistant control device results in various technical benefits. For example, it enables the functionality of the peripheral assistant control device to be dynamically adapted based on a currently active user, without necessitating that a user provide resource consuming further interface input to explicitly reconfigure the functionality each time the active user changes. Also, for example, it enables a single peripheral assistant control device, and optionally a single interaction, to have multiple functionalities in dependence on user—thus obviating the need for multiple separate peripheral assistant control devices for the multiple functionalities.

In some implementations, conditions for when the peripheral assistant control device is assigned control of particular functions can be established automatically in response to an automated assistant detecting a presence of the peripheral assistant control device. In some implementations, the peripheral assistant control device can communicate via Bluetooth and, when the user turns on the peripheral assistant control device, the device can pair with an existing client device owned by the user, or otherwise associated with the user. In response to the peripheral assistant control device pairing with the existing client device, the existing client device can invoke an automated assistant, which can provide a natural language output for directing further configuration of the peripheral assistant control device. For example, the automated assistant can cause the existing client device to render an audible natural language output, such as, "George, I've detected a new interface device in the living room. Would you like the new interface device to control the lights in the living room?" This natural language output can be generated based on the automated assistant identifying the location of the peripheral assistant control device, other existing devices in the living room that can be controlled via the automated assistant, and/or any other device that is in communication with the existing client device.

In response to the natural language output from the automated assistant, the user can confirm the configuration proposed by the automated assistant and/or request a different configuration for the peripheral assistant control device. For example, the user can provide a natural language input such as, "Assistant, when I am in the living room, have the interface device control the television, but when I am not in the living room, have the interface device control the lights in the living room" (the "interface device" can refer to the peripheral assistant control device). In response to receiving the natural language input from the user, the automated assistant can cause the peripheral assistant control device to be conditionally assigned control over the identified functions. Specifically, in order for the peripheral assistant control device to be assigned control over the lights, the automated assistant should determine that the user is not present in the living room. Additionally, in order for the peripheral assistant control device to be assigned control over the television, the automated assistant should determine that the user is actually present in the living room. Such determinations can be based on data that is accessible to the existing client device, the automated assistant, and/or any other associated device, as discussed herein.

The above description is provided as an overview of some implementations of the present disclosure. Further description of those implementations, and other implementations, are described in more detail below.

In some implementations, a method implemented by one or more processors as including operations such as determining, based on data that is accessible via a computing device, whether a first user or a second user is a currently active user of a peripheral assistant control device, wherein the peripheral assistant control device is in wireless communication with the computing device and an automated assistant is accessible via the computing device. The operations can further include receiving, from the peripheral assistant control device, other data that is generated in response to a touch interface of the peripheral assistant control device receiving a touch input, wherein receipt of the other data that is generated in response to interaction with the touch interface causes the automated assistant to perform a function, selected from at least a first automated assistant function and a second automated assistant function, according to whether the first user or the second user is determined to be the currently active user of the peripheral assistant control device. The operations can further include, when the first user is determined to be the currently active user: causing, in response to receiving the other data and determining that the first user is the currently active user, the automated assistant to execute the first automated assistant function. The operations can further include, when the second user is determined to be the currently active user: causing, in response to receiving the other data and determining that the second user is the currently active user, the automated assistant to execute the second automated assistant function, which is different from the first automated assistant function.

In some implementations, the first automated assistant function is also executable in response to a first corresponding spoken request to an automated assistant interface of the computing device, and the second automated assistant function is also executable in response to a second corresponding spoken request to the automated assistant interface of the computing device. In some implementations, the method can further include, prior to determining the currently active user of the peripheral assistant control device: assigning the first automated assistant function and the second automated assistant function to the peripheral assistant control device in response to the first user and/or the second user providing one or more spoken utterances requesting the automated assistant to assign the first automated assistant function and the second automated assistant function to the peripheral assistant control device. In some implementations, the method can further include, prior to determining the currently active user of the peripheral assistant control device: assigning the first automated assistant function to the peripheral assistant control device and to the first user based on determining that a first spoken utterance requests assignment of the first automated assistant function to the peripheral assistant control device, and based on determining that the first spoken utterance was provided by the first user. In some implementations, the method can further include assigning the second automated assistant function to the peripheral assistant control device and to the second user based on determining that a second spoken utterance requests assignment of the first automated assistant function to the peripheral assistant control device, and based on determining that the second spoken utterance was provided by the second user. In some implementations, the touch interface of the peripheral assistant control device includes a touch sensor that is responsive to tactile gestures. In some implementations, the peripheral assistant control device provides the other data exclusively in response to the interaction with the touch interface, and the touch interface is exclusively responsive to one or more tactile gestures.

In some implementations, the data that is accessible via the computing device comprises audio data detected via one or more microphones of the computing device prior to receiving the other data from the peripheral assistant control device; and wherein determining, based on the data that is accessible via the computing device, whether the first user or the second user is the currently active user of the peripheral assistant control device comprises: determining, based on processing the audio data, that the audio data matches a stored voice embedding for the first user; and determining that the first user is the active user based on the audio data matching the stored voice embedding for the first user. In some implementations, determining that the first user is the active user is further based on: determining that the audio data was detected within a threshold amount of time of receiving the other data from the peripheral assistant control device. In some implementations, wherein the first automated assistant function comprises altering a property of a smart device, and wherein causing the automated assistant to execute the first automated assistant function comprises: determining a current state of the property of the smart device, and generating, based on the current state, a command that causes the property of the smart device to transition to an alternate state that differs from the current state; and transmitting the command to the smart device or to a server associated with the smart device. In some implementations, the method can further include receiving input that requests assignment, to the peripheral assistant control device, of only a function that causes the property of the smart device to transition to the current state; and automatically assigning the first automated assistant function to the smart device in response to receiving the input, wherein the first automated assistant function alters the property of the smart device between at least the current state and an alternate state instead of only causing the property of the smart device to transition to the current state.

In yet other implementations, a method implemented by one or more processors, the method comprising: determining, based on data that is accessible via a computing device, whether a peripheral assistant control device is located at a first area or a second area, wherein the peripheral assistant control device is in wireless communication with the computing device, and an automated assistant is accessible via the computing device. The method can further include receiving, from the peripheral assistant control device, other data that is generated in response to a touch interface of the peripheral assistant control device receiving a touch input, wherein interaction with the touch interface causes the automated assistant to perform a function, selected from at least a first automated assistant function and a second automated assistant function, according to whether the peripheral assistant control device is determined to be located at the first area or the second area. The method can further include, when the peripheral assistant control device is determined to be at the first area: causing, in response to receiving the other data and determining that the peripheral assistant control device is determined to be at the first area, the automated assistant to execute the first automated assistant function. The method can further include, when the peripheral assistant control device is determined to be at the second area: causing, in response to receiving the other data and determining that the peripheral assistant control device is determined to be at the second area, the automated assistant to execute the second automated assistant function, which is different from the first automated assistant function.

In some implementations, the data that is accessible via the computing device indicates that the peripheral assistant control device is directly paired, via a wireless communication protocol, with only the computing device, and wherein determining whether the peripheral assistant control device is located at the first area or the second area comprises determining that the peripheral assistant control device is located at the first area based on the paired computing device being assigned, in a device topology, to the first area. In some implementations, the method can further include, prior to determining whether the peripheral assistant control device is located at the first area or the second area: receiving input that requests assignment, to the peripheral assistant control device, of control of a type of smart device. In some implementations, the method can further include generating, based on the input, the first automated assistant function to cause control of one or more first smart devices of the type based on the first smart devices being of the type and being assigned, in a device topology, to the first area. In some implementations, the method can further include generating, based on the input, the second automated assistant function to cause control of one or more second smart devices of the type based on the second smart devices being of the type and being assigned, in a device topology, to the second area.

In some implementations, the method can further include, prior to determining whether the peripheral assistant control device is located at the first area or the second area: assigning the first automated assistant function to the first area based on user interface input that request assignment of the first automated assistant function to the peripheral assistant control device and to the first area. In some implementations, the method can further include, prior to determining whether the peripheral assistant control device is located at the first area or the second area: assigning the second automated assistant function to the second area based on user interface input that request assignment of the second automated assistant function to the peripheral assistant control device and to the second area. In some implementations, the computing device is one device of multiple different assistant computing devices defined in a device topology that is accessible to the automated assistant, and wherein determining whether the peripheral assistant control device is located at the first area or the second area includes determining which of the multiple assistant computing devices the peripheral assistant control device is paired with and/or is most proximal to.

In yet other implementations, a method implemented by one or more processors is set forth as including operations such as receiving audio data corresponding a spoken utterance provided by a user to an automated assistant interface of a computing device, wherein the computing device provides access to an automated assistant and is connected to a peripheral assistant control device. The method can further include determining, based on the audio data, that the spoken utterance includes a request for controlling one or more functions in response to an interaction with a touch interface of the peripheral assistant control device, wherein the peripheral assistant control device provides an output to the computing device, or another computing device, in response to the interaction with the touch interface. The method can further include determining, based on the audio data, that the spoken utterance at least partially identifies the one or more functions for correlating to the output of the peripheral assistant control device. The method can further include identifying, based on data that is associated with the one or more functions, one or more other functions that are executable via the computing device or the automated assistant, wherein the spoken utterance is void of content specifying the one or more other functions. The method can further include generating correlation data that correlates the output of the peripheral assistant control device with the one or more functions when at least a first condition is satisfied, and correlates the output of the peripheral assistant control device with the one or more other functions when at least a second condition is satisfied.

In some implementations, the method can further include determining, subsequent to generating the correlation data, that the peripheral assistant control device has provided the output in response to the user interacting with the touch interface. In some implementations, the method can further include determining, based on other data that is associated with the user, whether the first condition or the second condition is satisfied. In some implementations, the method can further include, when the first condition is satisfied: causing the one or more functions to be executed in response to the user interacting with the touch interface of the peripheral assistant control device. In some implementations, the method can further include, when the second condition is satisfied: causing the one or more other functions to be executed in response to the user interacting with the touch interface of the peripheral assistant control device.

In some implementations, the one or more functions include an initiating media action that causes rendering of media, and the first condition is satisfied when media is not being rendered at the computing device and/or another device associated with the user, and wherein the second condition is satisfied when media is being rendered at the computing device or the other device associated with the user. In some implementations, the one or more other functions include a next media item action that causes a new media item to be rendered in replacement of a current media item currently being rendered. In some implementations, the one or more functions, when executed, cause the computing device or another device to operate according to a setting, and the second condition is satisfied when the computing device or the other device is operating according to the setting, and wherein the one or more other functions, when executed, cause the computing device or the other device to operate according to another setting, and the first condition is satisfied when the computing device or the other device is operating according to the other setting.

In some implementations, the one or more functions, when executed, cause the computing device to operate according to the setting, and wherein the one or more other functions, when executed, cause the other device to operate according to the other setting. In some implementations, the one or more functions cause the computing device to transition operating modes from a first operating mode to a second operating mode, and wherein the one or more other functions cause the computing device to transition the operating modes from the second operating mode to the first operating mode. In some implementations, the first operating mode causes the computing device to provide a first output via a modality of the computing device and the second operating mode causes the computing device to provide a second output, which is different from the first output, via the modality of the computing device. In some implementations, the first condition includes a property of a smart device being in a first state, and wherein the second condition includes the property of the smart device being in a second state. In some implementations, the one or more functions comprise causing the property of the smart device to transition from the first state to the second state, and wherein the one or more other functions comprise causing the property of the smart device to transition from the second state to the first state. In some implementations, the method can further include determining that the peripheral assistant control device has provided the output in response to the user interacting with the touch interface; In some implementations, the method can further include determining, in response to the output being provided and based on a device topology that defines a current state of the property of the smart device, whether the first condition or the second condition.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
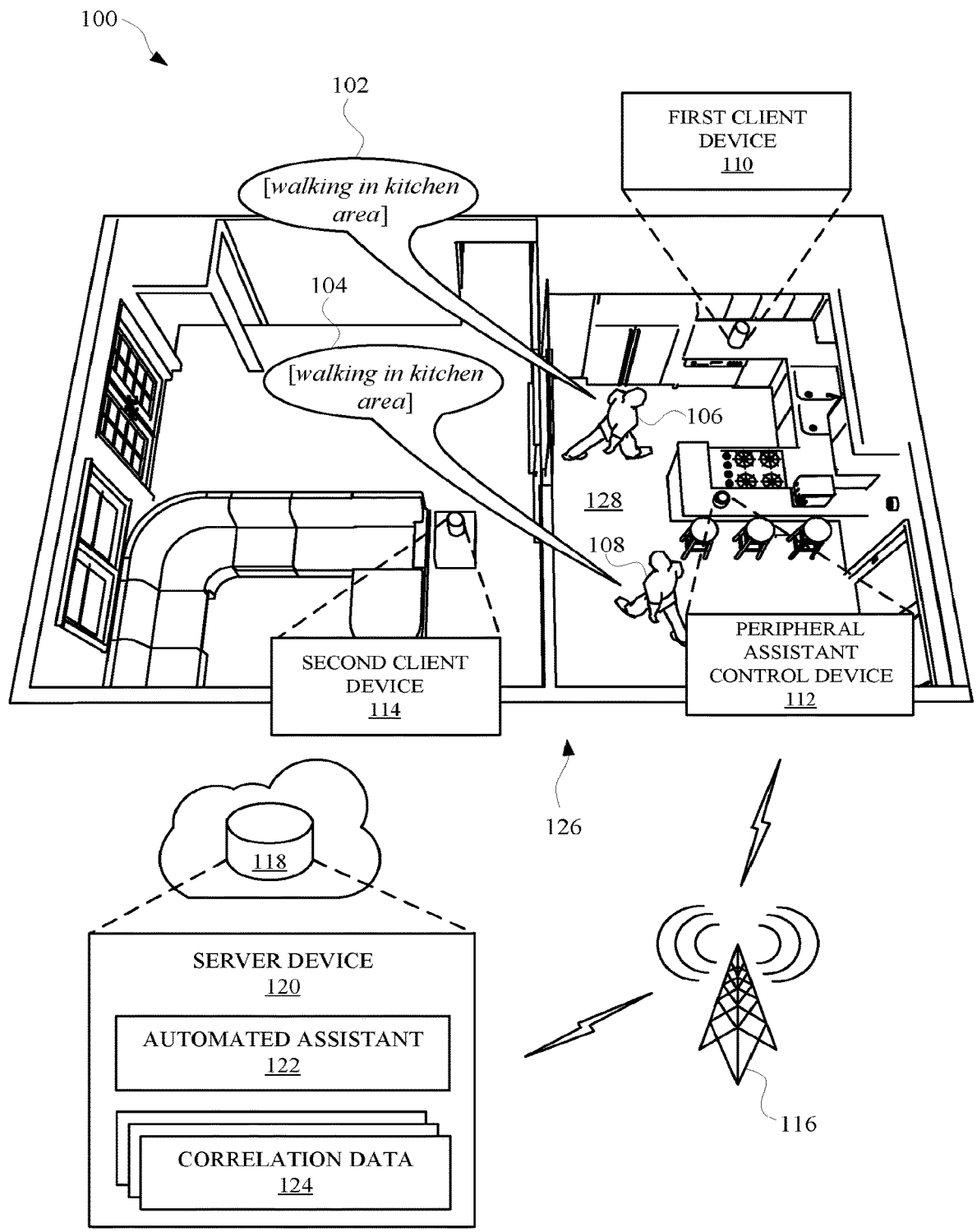
FIG. 1A and FIG. 1B illustrate views of a peripheral assistant control device having functions that are separately assigned according to whether a particular user is determined to be present in an area that includes the peripheral assistant control device.
Figure 1B:
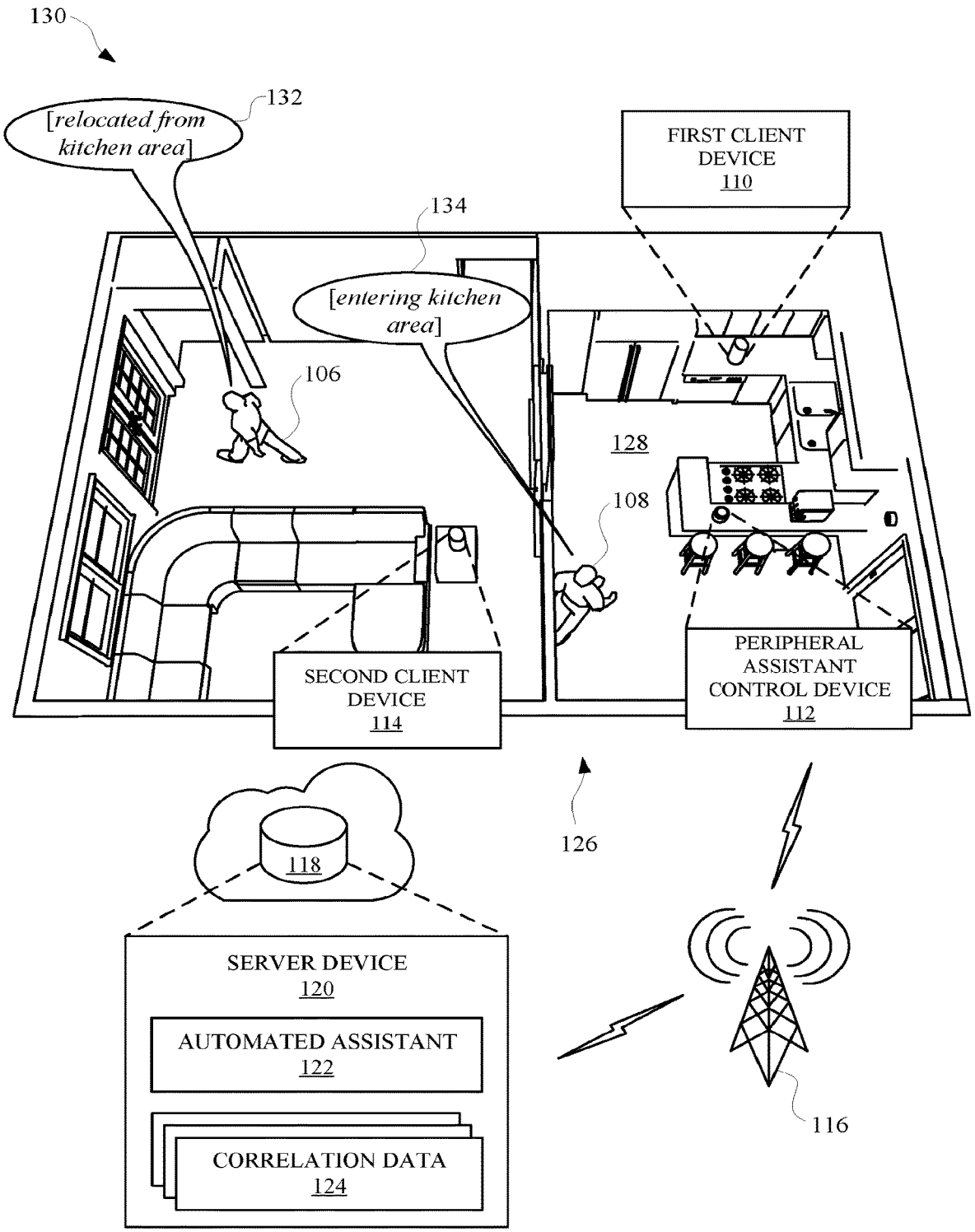

FIG. 1A and FIG. 1B illustrate a view 100 and a view 130 of a peripheral assistant control device 112 having functions that are separately assigned according to whether a particular user is determined to be present in an area that includes the peripheral assistant control device 112. Specifically, FIG. 1A illustrates a view 100 of a peripheral assistant control device 112 being assigned a first assistant function when a first user 106 is determined to be present in a location of the peripheral assistant control device 112, and/or otherwise determined to be proximate to the peripheral assistant control device 112. For example, when a first user 106 is determined to be located within an area 128 of their home 126 (e.g., a kitchen of the home), the peripheral assistant control device 112 can reassigned control of a first assistant function (e.g., turn on/off kitchen lights). However, when the user is determined to have relocated away from the area 128 and/or the home 126, as illustrated in FIG. 1B, and/or a second user 108 is determined to the present within the area 128 of the home 126, and/or otherwise proximate to the peripheral assistant control device 112, the peripheral assistant control device 112 can be assigned to control of a second assistant function (e.g., play music at a first client device 110).

For instance, the first user 106 can provide a request to an application accessible via a computing device for requesting that the peripheral assistant control device 112 control lights in their kitchen when the first user 106, specifically, is interacting with the peripheral assistant control device 112. Additionally, the second user 108 can also use an application for requesting that the peripheral assistant control device 112 control music rendered by the first client device 110 when the second user 108, specifically, is interacting with the peripheral assistant control device 112. Thereafter, when the first user 106 is determined to by present and interacting with the peripheral assistant control device 112, the peripheral assistant control device 112 can be assigned control over the lights in the kitchen. Therefore, any interaction with between the first user 106 and the peripheral assistant control device 112 at that time will result in operations of the kitchen lights being modified. Furthermore, when the first user 106 is no longer present, but the second user 108 is present and interacting with the peripheral assistant control device 112, any interactions between the second user 108 and the peripheral assistant control device 112 will result in causing the first client device 110 to render music based on the interactions.

In some implementations, a server device 120 and/or a client device can consider either the first user 106 or the second user 108 "active" with respect to their ability to influence assignment of controls for the peripheral assistant control device 112. Furthermore, whether a particular user is "active" with respect to the peripheral assistant control device 112 can be based on a voice identification of the first user 106 and/or the second user 108. For instance, and with previous permission from the first user 106, the first client device 110 and/or the server device 120 can perform speech processing to determine whether the first user 106 has provided a recent spoken utterance to the first client device 110. If the first user 106 has been identified, based on voice characteristics of the first user 106, to have been the user who most recently provided the spoken utterance, the peripheral assistant control device 112 can be assigned control over one or more particular functions (e.g., controlling the kitchen lights) as preferred by the first user 106. Furthermore, the second user 108 can subsequently interact with the first client device 110 by providing a spoken utterance. The first client device 110 and/or the server device 120 can identify the second user 108 as the user who provided the subsequent spoken utterance, and cause the peripheral assistant control device 112 to be assigned control over one or more other particular functions (e.g., controlling music rendered by the first client device 110) as preferred by the second user 108.

In some implementations, when the first user 106 is considered to be "active" with respect to the peripheral assistant control device 112, the "active" time of the first user 106 can expire after a period of time, and/or in response to the automated assistant confirming that another user is present or the first user 106 has left the area 128. For example, after the first user 106 has interacted with the peripheral assistant control device 112 while the peripheral assistant control device 112 was assigned control of functions preferred by the first user 106, the second user 108 can be determined to be present and/or interact with the peripheral assistant control device 112. In response, the "active" state of the first user 106 with respect to the peripheral assistant control device 112 can expire, and the peripheral assistant control device 112 can be assigned control over one or more other functions (e.g., playing music) as preferred by the second user 108. Additionally, or alternatively, when the second user 108 has ceased interacting with the peripheral assistant control device 112 for a threshold period of time, the first client device 110 and/or the server device 120 can reassign control of the peripheral assistant control device 112 to control one or more functions preferred by the first user 106. In some implementations, the peripheral assistant control device 112 can transition back to have control over the preferred functions of the first user 106 in response to: the first user 106 responding to an inquiry from the first client device 110 such as, "First User, are you there?", or the second user 108 not responding to an inquiry from the first client device such as, "Second User, are you there?" after a threshold period of time.

In some implementations, the peripheral assistant control device 112 can include one or more lights that illuminate to indicate a user that is "active" with respect to the peripheral assistant control device 112. For instance, when the peripheral assistant control device 112 is assigned control over one or more functions preferred by the first user 106, one or more lights of the peripheral assistant control device 112 can be caused to emit a first color (e.g., green). Furthermore, when the peripheral assistant control device 112 is assigned control over one or more other functions preferred by the second user 108, the one or more lights of the peripheral assistant control device 112 can be caused to emit a second color (e.g., red) that is different from the first color.

The peripheral assistant control device 112 can operate as a computing device with one or more touch sensors that are responsive to one or more tactile gestures. For instance, the peripheral assistant control device 112 can include one or more touch sensitive sensors capable of providing a signal in response to one or more different touch gestures provided by one or more users. The peripheral assistant control device 112 can connect with one or more client devices and/or server devices, in order to communicate the signals generated in response to a touch input. For example, the peripheral assistant control device 112 can be in communication with a first client device 110 and/or a second client device 114 via a communication protocol such as Bluetooth, Wi-Fi, LTE, and/or any other wired or wireless communication protocol. In response to a user providing a touch gesture to the peripheral assistant control device 112, the peripheral assistant control device 112 can transmit a signal to the first client device 110 and/or the second client device 114. In some implementations, the first client device 110 and/or the second client device 114 can be in communication with a remote computing device 118, such as a server device 120, via a network 116, such as the internet. The first client device 110 and/or the second client device 114 can communicate data to the server device 120 indicating that the user has provided a touch input to the peripheral assistant control device 112. In this way, various devices and/or applications, such as an automated assistant 122, can be controlled via the peripheral assistant control device 112.

In some implementations, the peripheral assistant control device 112 can be exclusively responsive to direct touch inputs from the user, as well as signals transmitted from one or more devices to and from the peripheral assistant control device 112. In this way, the peripheral assistant control device 112 can include limited hardware (e.g., relative to a laptop computer and/or a cellular phone) thereby reducing power consumption and network latency that would otherwise be exhibited by a computing device that is not exclusively responsive to direct touch inputs from the user or does not have the limited hardware. In some implementations, the peripheral assistant control device 112 can be responsive to various different touch gestures such as a single tap, double tap, other multi-tap, extended press, and/or any variation of a touch input. Each of the touch gestures can be responded to differently by a client device and/or server device depending on circumstances or context in which the user provided a particular touch gesture.

As illustrated in FIG. 1A, a first user 106 and a second user 108 can be located within an area of a home 126 in which the users reside, and that area can include a peripheral assistant control device 112. Specifically, the first user 106 can exhibit a condition 102 of walking in the kitchen area, and the second user 108 can exhibit a condition 104 of also walking in the kitchen area. The peripheral assistant control device 112 can be connected with the first client device 110, the second client device 114, and/or the server device 120. Using prior permission from the first user 106, the first client device 110, second client device 114, and/or the server device 120, can determine a presence of the first user 106. Specifically, the presence of the first user 106 can be characterized by data that indicates whether the first user 106 is within the home 126, the area 128, proximate to the peripheral assistant control device 112, and/or otherwise within a distance of the peripheral assistant control device 112 that allows the first user 106 to interact with the peripheral assistant control device 112 without having to maneuver at least a threshold distance, and/or maneuver for least a threshold amount of time before arriving at the peripheral assistant control device.

When the presence of the first user 106 is determined and/or otherwise confirmed, the first client device 110, second client device 114, and/or the server device 118 can cause one or more signals provided by the peripheral assistant control device 112 to be correlated to a particular function. For instance, a correlation between one or more particular functions and one or more particular peripheral assistant control device outputs can be characterized by correlation data 124. Specifically, and as an example, the correlation data 124 can characterize a relationship between the presence of the first user 106 and control of one or more functions via the peripheral assistant control device 112. The correlation data 124 can identify a first assistant function, of the one or more functions, that can be controlled via a touch interface of the peripheral assistant control device 112, when the first user 106 is determined to be present near the peripheral assistant control device 112.

Furthermore, control of one or more other functions can be correlated to a determination that the first user 106 is not present. For example, as illustrated in FIG. 1B, the peripheral assistant control device 112, the first client device 110, second client device 114, and/or the server device 120, can determine that the first user is no longer present at or near the peripheral assistant control device 112. Rather, the first user 106 can exhibit a condition 132 of being relocated from the area 128. In response to determining that the first user 106 is no longer present at or near the peripheral assistant control device 112, data provided by the peripheral assistant control device 112, in response to the second user 108 interacting with the peripheral assistant control device 112, can be correlated to one or more other functions. For instance, when the second user 108 interacts with the peripheral assistant control device 112 and the first user 106 has relocated from the area 128, the interaction can cause the one or more other functions to be executed or otherwise controlled. In some implementations, the one or more other functions can include a second automated assistant function, which is executed or controlled when the second user 108 provides an input gesture to the peripheral assistant control device 112 when the first user 106 is determined to not be present at or near at the peripheral assistant control device 112.

In some implementations, assignment of control of one or more functions can be based on a particular area in which the first user 106 and the second user 108 are determined to be present. For instance, when the first user 106 is determined to be present within the living room by the second client device 114, the peripheral assistant control device 112 can be assigned control over a first function. Furthermore, when the first user 106 is determined to be present within the kitchen by the first client device 110, the peripheral assistant control device 112 can be assigned control over a second function, which is different than the first function. In some implementations, when no particular user is detected, and/or an unidentified user is detected, the peripheral assistant control device 112 can be assigned control over one or more particular functions. In some implementations, when a combination of different users is detected, the peripheral assistant control device 112 can be assigned control over one or more particular functions, which can be different than one or more other functions that the peripheral assistant control device 112 would be assigned control over, if a presence of the first user 106 is detected and/or a presence of the second user 108 is detected.

In some implementations, one or more functions that the peripheral assistant control device 112 can be assigned control over can be automated assistant functions. In other words, the one or more functions can be controlled by, or executed via, an automated assistant that is accessible via the first client device 110, the second client device 114, and/or the server device 120. Therefore, the one or more functions can be controlled and/or executed via a spoken utterance provided to an automated assistant interface of the first client device 110, and also by providing an input gesture, such as a tap gesture, to the touch interface of the peripheral assistant control device 112.

Figure 2A:
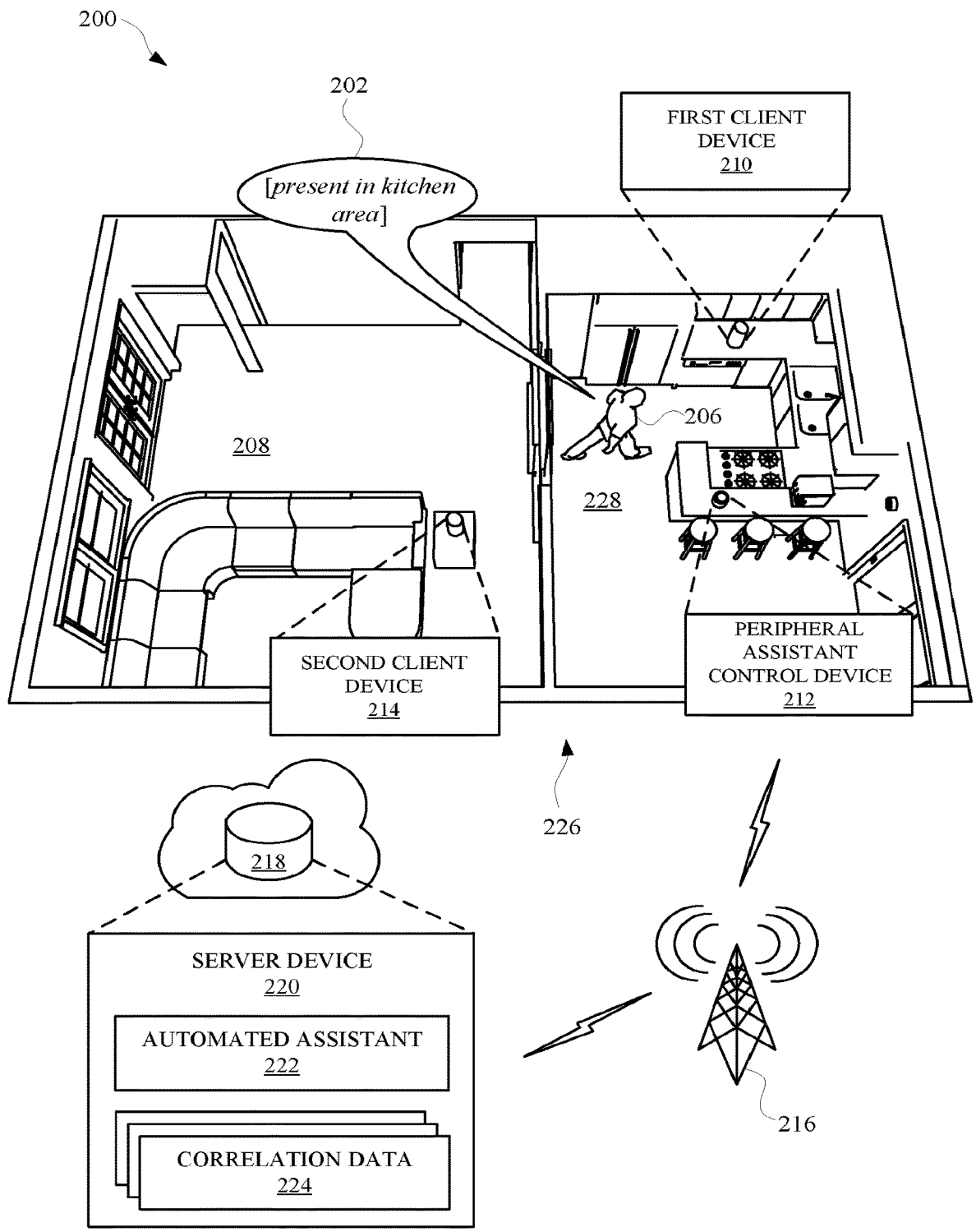
FIG. 2A and FIG. 2B illustrate views of control of one or more functions being assigned to a peripheral assistant control device based on a location of the peripheral assistant control device.
Figure 2B:
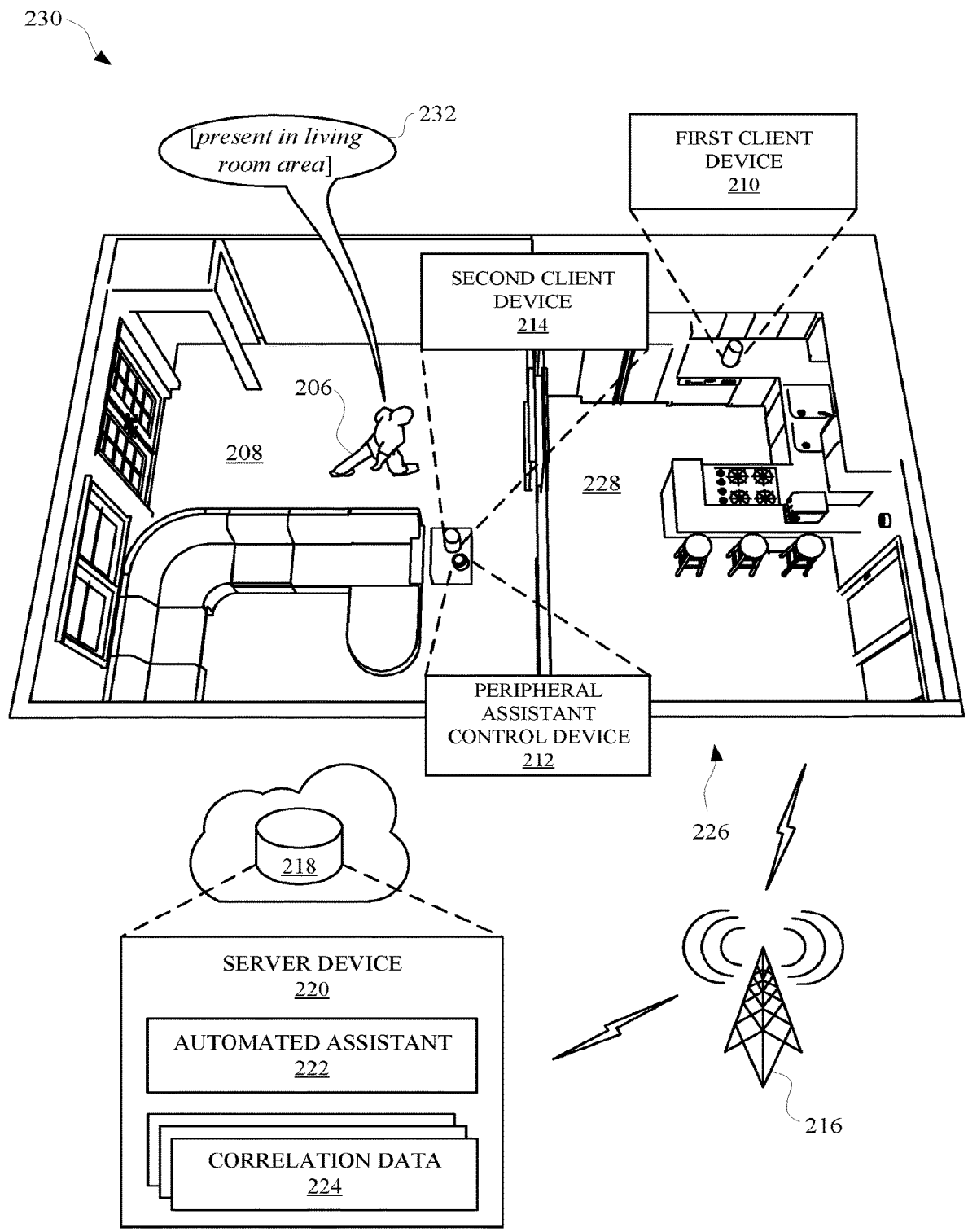

FIG. 2A and FIG. 2B illustrate a view 200 and a view 230, respectively, of control of one or more functions being assigned to a peripheral assistant control device 212 based on a location of the peripheral assistant control device 212. For instance, the peripheral assistant control device 212 can be assigned control of one or more functions when the peripheral assistant control device 212 is in a first area 228, such as a kitchen. Furthermore, the peripheral assistant control device 212 can be assigned control of one or more other functions when the peripheral assistant control device 212 is in a second area 208, such as a living room.

A determination of whether the peripheral assistant control device 212 is in the first area 228 or the second area 208 can be based on data that characterizes a device topology of devices associated with a user 206. For instance, device topology data can be accessible at a remote computing device 218, such as a server device 220, which can be accessed via a network 216, such as the internet. The device topology data can include identifiers for the first client device 210 and the second client device 214. Furthermore, each device identifier can be correlated to an area identifier corresponding to a geographical area accessible to the user 206. For instance, a first identifier for the first client device 210 can be correlated to a first area identifier for the first area 228. Additionally, a second identifier for the second client device 214 can be correlated to a second area identifier for the second area 208.

The server device 220 can include correlation data 224, which can identify various correspondence between different areas accessible to the user 206 and different functions that can be controllable via a peripheral assistant control device 212. Furthermore, an assumption can be made that when the peripheral assistant control device 212 is connected to the first client device 210, the peripheral assistant control device 212 is located within the first area 228. For example, such an assumption can be based on the first client device 210 being assigned to the first area 228 in a device topology representation. Moreover, another assumption can be made that when the peripheral assistant control device 212 is connected to a second client device 214, the peripheral assistant control device 212 is located in the second area 208. For example, such an assumption can be based on the second client device 214 being assigned to the second area 208 in a device topology representation. Therefore, when the peripheral assistant control device 212 is paired or otherwise connected with the first client device 210, any data provided by the peripheral assistant control device 212, such as data generated in response to a touch input from the user 206, can be processed based on the assumption that the peripheral assistant control device 212 is located in the first area 228. Additionally, when the peripheral assistant control device 212 is paired with or otherwise connected to the second client device 214, any data provided by the peripheral assistant control device 212 can be processed based on the assumption that the peripheral assistant control device 212 is located in the second area 208.

In one non-limiting example, the user 206 can provide a spoken utterance to an automated assistant interface, such as a microphone of the first client device 210, requesting that the peripheral assistant control device 212 be assigned to different functions according to certain conditions. The spoken utterance can be, "Assistant, when my peripheral assistant control device is in the kitchen, please provide the news when I perform a touch input." Furthermore, within the same spoken utterance or a different spoken utterance, the user 206 can provide a request such as, "Assistant, also, when the peripheral assistant control device is in the living room, please control the television when I perform a touch input." In response to receiving the spoken utterance, the first client device 210 can generate audio data that can be transmitted to the server device 220, which can process the audio data via an automated assistant 222 application at the server device 220. The audio data can be processed to determine a configuration for certain settings of the peripheral assistant control device 212. For instance, the server device 220, and/or any other device discussed herein, can determine that the user 206 is requesting that the peripheral assistant control device 212 control a first function when located in the first area 228, illustrated in view 200 of FIG. 2A, and control a second function when located in the second area 208, as illustrated in view 230 of FIG. 2B.

Additionally, or alternatively, the user 206 can provide a spoken utterance such as, "Assistant, please control the lights in the room that I am in," and/or otherwise provide an input (e.g., a textual input) having the same meaning. In response to receiving the spoken utterance, the first client device 210 can generate audio data that can be transmitted to the server device 220, which can process the audio data via an automated assistant 222 application at the server device 220. The audio data can be processed to determine a configuration for certain settings of the peripheral assistant control device 212. For instance, the server device 220, and/or any other device discussed herein, can identify another device that is located within a current vicinity or a current area of the user 206. Based a data that indicates a location of the other device, a setting can be generated such that, when the peripheral assistant control device 212 is paired with, or otherwise in communication with, the other device, the peripheral assistant control device 212 will be assigned control over the lights in the location. Furthermore, a device topography representation, which can correlate a location of the other device with the lights, can be used as a basis for assigning control of the lights to the peripheral assistant control device 212 when the peripheral assistant control device 212 is paired with, or otherwise in communication with the other device.

In some implementations, a determination of where the peripheral assistant control device 212 is located can be based on the device topology data. Alternatively, or additionally, a determination of where the peripheral assistant control device 212 is located can be based on output of one or more sensors and/or one or more transmitters of the peripheral assistant control device 212, the first client device 210, and/or the second client device 214. For instance, signal strength of a local area network, such as a Wi-Fi network, available to the peripheral assistant control device 212, can be used as an indication of where the peripheral assistant control device 212 is located within a home 226. Furthermore, the signal strength of the local area network can be used in combination with device topology data to determine where the peripheral assistant control device 212 is located, when the device topology data provides an indication of a location of the source of the local area network signal. Optionally, the location of the peripheral assistant control device 212 can be based on a comparison between signal strength at the first client device 210, the second client device 214, and the peripheral assistant control device 212, respectively, in combination with the known location of the source of the local area network signal.

In some implementations, a determination of where the peripheral assistant control device 212 is located can be based on output of one or more sensors and/or one or more transmitters, such as one or more of such devices included in a global positioning system (GPS) device. For instance, the peripheral assistant control device 212 can include a GPS device, which can provide an output that indicates a location of the peripheral assistant control device 212. Therefore, when the user provides a touch input to the peripheral assistant control device 212, the peripheral assistant control device 212 can communicate output data that identifies a location of the peripheral assistant control device according to the GPS device, and that identifies a type of touch input received from the user 206. The device receiving the output data can compare the indicated location of the peripheral assistant control device 212 with the correlation data 224 to identify one or more functions that the user 206 is intending to control, via touch input at the peripheral assistant control device 212 when the peripheral assistant control device 212 is at the indicated location. In other words, in some implementations, data characterizing a touch input from the user 206 can be the same no matter where the peripheral assistant control device 212 is located, however, that data can be responded to differently by another device, such as the server device 220, depending on where the peripheral assistant control device 212 is located.

Figure 3:
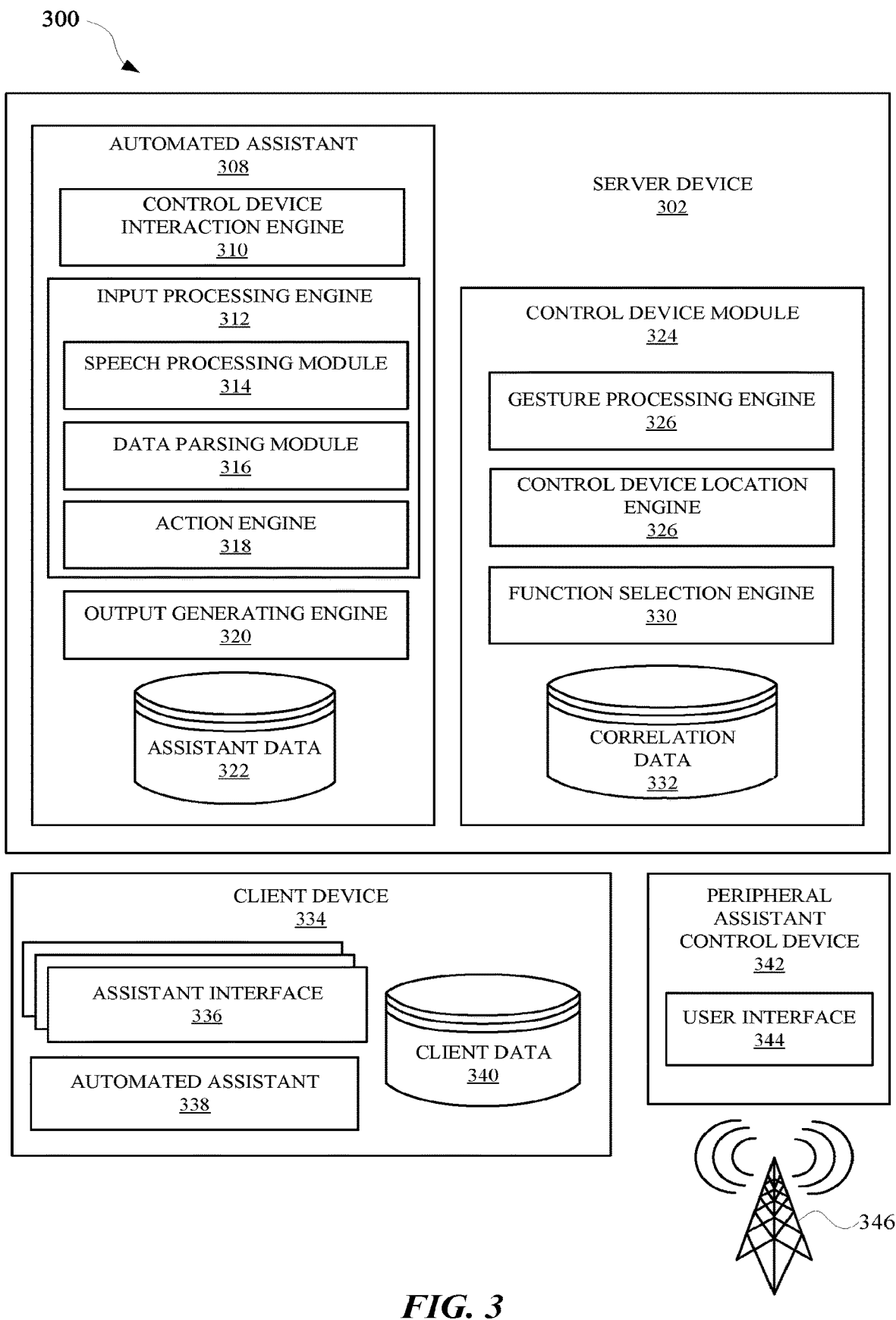
FIG. 3 illustrates a system for assigning control, over one or more executable assistant functions, to a peripheral assistant control device according to whether one or more different conditions are satisfied.

FIG. 3 illustrates a system 300 for assigning control, over one or more executable assistant functions, to a peripheral assistant control device according to whether one or more different conditions are satisfied. The automated assistant 306 can operate as part of an automated assistant application that is provided at one or more computing devices, such as a client device 334, and/or a server device 302. A user can interact with the automated assistant 308 via one or more assistant interfaces 336, which can include one or more of a microphone, a camera, a touch screen display, a user interface, and/or any other apparatus capable of providing an interface between a user and an application. For instance, a user can initialize the automated assistant 308 by providing a verbal, textual, or a graphical input to the assistant interface to cause the automated assistant 308 to perform a function (e.g., provide data, control a peripheral device, access an agent, etc.). The client device 334 and/or the peripheral assistant control device 342 can include a display device, which can be a display panel that includes a touch interface for receiving touch inputs and/or gestures for allowing a user to control applications of the client device 334 and/or the server device 302 via the touch interface.

In some implementations, the client device 334 and/or the peripheral assistant control device 342 can lack a display device but include an audio interface (e.g., a speaker and/or a microphone), thereby providing an audible user interface output, without providing a graphical user interface output, as well as providing a user interface, such as a microphone, for receiving spoken natural language inputs from a user. For instance, in some implementations, the peripheral assistant control device 342 can include one or more tactile input interfaces, such as one or more buttons, and omit a display panel that is provided graphical data from a graphics processing unit (GPU). In this way, substantial energy and processing resources can be saved compared to a computing device that includes a display panel and GPU.

The client device 334 can be in communication with the server device 302 over a network 346, such as the internet. The client device 334 can offload computational tasks to the server device 302 in order to preserve computational resources at client device 334 and/or the peripheral assistant control device 342. For instance, the server device 302 can host an automated assistant 308, and the client device 334 can transmit inputs received at one or more assistant interfaces, and/or a user interface 344 of the peripheral assistant control device 342, to the server device 302. However, in some implementations, the automated assistant 308 can be hosted at the client device 334. In various implementations, all or less than all aspects of the automated assistant 308 can be implemented on the server computing device 304 and/or the client device 334. In some of those implementations, aspects of the automated assistant 308 are implemented via a local automated assistant 338 of the client device 334 and interface with the server device 302, which can implement other aspects of the automated assistant 308. The server device 302 can optionally serve a plurality of users and their associated assistant applications via multiple threads. In implementations where all or less than all aspects of the automated assistant 308 are implemented via a local automated assistant 338 of the client device 334, the local automated assistant 338 can be an application that is separate from an operating system of the client device 334 (e.g., installed "on top" of the operating system)—or can alternatively be implemented directly by the operating system of the client device 334 (e.g., considered an application of, but integral with, the operating system).

In some implementations, the automated assistant 308 and/or automated assistant 338 can include an input processing engine 312, which can employ multiple different modules for processing inputs and/or outputs for the client device 334. For instance, the input processing engine 312 can include a speech processing module 314 that can process audio data received at an assistant interface 336 to identify the text embodied in the audio data. The audio data can be transmitted from, for example, the client device 334 to the server device 302 in order to preserve computational resources at the client device 334.

The process for converting the audio data to text can include a speech recognition algorithm, which can employ neural networks, word2vec algorithms, and/or statistical models for identifying groups of audio data corresponding to words or phrases. The text converted from the audio data can be parsed by a data parsing module 316 and made available to the automated assistant 308 as textual data that can be used to generate and/or identify command phrases from the user. In some implementations, output data provided by the data parsing module 316 can be provided to an action engine 318 to determine whether the user has provided an input that corresponds to a particular action and/or routine capable of being performed by the automated assistant 308 and/or an application or agent that is capable of being accessed by the automated assistant 308. For example, assistant data 322 can be stored at the server device 302 and/or the client device 334, as client data 340, and can include data that defines one or more actions capable of being performed by the automated assistant 308, as well as parameters involved in performing those actions.

When the input processing engine 312 has determined that a user has requested a particular action or routine be performed, the action engine 318 can determine one or more parameters for the particular action or routine, and an output generating engine 320 can then provide an output to the user based on the particular action, routine, and/or the one or more parameters. For instance, in some implementations, in response to a user input, such as a gesture directed at the user interface 344 of the peripheral assistant control device 342, the automated assistant 338 can cause data, which characterizes the gesture, to be transmitted to the server device 302 for determining the action that the user is intending the automated assistant 308 and/or automated assistant 338 to perform.

The system 300 can include one or more peripheral assistant control devices 342, and each peripheral assistant control device 342 can include one or more user interfaces 344. A user interface 344 can include one or more sensors capable of providing an output in response to a user input from a user. For instance, the one or more sensors can include a tactile sensor (i.e., a touch sensor) that provides an output signal in response to a tactile gesture from the user. The output signal can be transmitted, via a communication protocol such as Bluetooth, LTE, Wi-Fi, and/or any other communication protocol, to the client device 334 and/or the server device 302. In some implementations, the output signal from the one or more sensors of the user interface 344 can be converted into user input data by one or more processors of the peripheral assistant control device 342. The user input data can be transmitted to the client device 334 via a communication protocol, and either processed at the client device 334 and/or transmitted via the network 346 to the server device 302. For instance, the client device 334 and/or the server device 302 can determined, based on the user input data, a function that is to be controlled by the peripheral assistant control device 342.

In some limitations, determining the function to be controlled by the peripheral assistant control device 342 can be based on an identity of the client device 334 that the peripheral assistant control device 342 is paired with or otherwise in communication with. In other words, the client device 334 and/or the server device 302 will determine different functions for the peripheral assistant control device 342 to control according to the particular client device that the peripheral assistant control device 342 is connected to. In some implementations, assignment of control of a particular function to the peripheral assistant control device 342 can be based on physical characteristics of the client device 334. For example, the peripheral assistant control device 342 can be assigned control of a first function when the peripheral assistant control device 342 is paired with a device that includes a touch display panel. Additionally, the peripheral assistant control device 342 can be assigned control of a second function, which is different than the first function, when the peripheral assistant control device 342 is paired with a device that does not include a touch display panel. Alternatively, or additionally, the peripheral assistant control device 342 can be assigned control of a first function when the peripheral assistant control device 342 is paired with a device identified by an account of a first user. Furthermore, the peripheral assistant control device 342 can be assigned control of a second function when the peripheral assistant control device 342 is paired with a different device identified by a different account of a second user, who is different from the first user.

In some implementations, a request from a user to assign control of a function to a peripheral assistant control device 342 can be expanded, in order that the peripheral assistant control device 342 can have control over other functions not explicitly identified in the request from the user. For example, a user can provide a spoken utterance such as "Assistant, go to the next song in my playlist when I tap the peripheral assistant control device." The spoken utterance can be received at the assistant interface 336, converted to audio data by the client device 334, and transmitted to the server device 302 for further processing. Using the audio data, the automated assistant 308 can determine that the user is requesting that the peripheral assistant control device 342 have control over a function of skipping a song that is playing from a playlist.

Thereafter, when the user is listening to music from the playlist and presses the user interface 344 of the peripheral assistant control device 342, the automated assistant 308 can cause playback of a playlist to transition from a current song to the next song in the playlist. In some implementations, the peripheral assistant control device 342 can provide data in response to receiving the touch input at the user interface 344. The data can be transmitted to the client device 334, and then to the server device 302 for further processing. The server device 302 can include a control device module 324, which can determine how the automated assistant 308 and/or any other application associated with the server device 302 and/or the client device 334, will respond to the user providing an input to the peripheral assistant control device 342.

The control device module 324 can include a gesture processing engine 326 that receives the data from the peripheral assistant control device 342, in response to an input from the user, and determines the type of gesture provided by the user. For instance, the data can be processed by the gesture processing engine 326 to determine whether the input gesture was a single tap, double tap, multi-tap, long tap, hard press, soft press, and/or any other distinguishable gesture that can be provided to an interface of a computing device. In some implementations, the control device module 324 can access and/or receive some amount of client data 340, indicative of a presence of one or more users within an area that is associated with the peripheral assistant control device 342 and/or the client device 334. In this way, the control device module 324 can determine a function that the output at the peripheral assistant control device 342 will affect based on the touch input received and the one or more users that are determined to be present. For example, the control device module 324 can include a function selection engine 330, which can access the client data 340 that indicates the presence of one or more users, and can also access correlation data 332, which can provide a correspondence between a function to be controlled by the peripheral assistant control device 342 and a user that is indicated as present when the user interface 344 receives an input. In other words, the correlation data 332 will characterize a setting requested by a user for controlling a function via the user interface 344 according to whether the user is present or not. Therefore, if such a setting is characterized by the correlation data 332 and, the client data 240 indicates that the user is present when the user interface 344 received an input, the corresponding function identified by the correlation data 332 can be controlled in response to the input.

Control of a function can be defined as executing a function, modifying one or more instances of execution of the function by one or more devices, modifying one or more instances of execution of the function by one or more applications, and/or any other control that can be exhibited over a function and/or execution of the function. In some implementations, control of a function can be defined as providing a value for a parameter for the function, modifying a value for a parameter of a function, and/or otherwise modifying data that is used when executing a function. For example, a function of skipping a song in a playlist can include a parameter for providing a device name Therefore, when control of the function is assigned to the peripheral assistant control device 342, the control device module 324 can cause execution of the function in response to a touch input at the user interface 344, and also provide a device name for the parameter of the function, in order that the function can be executed without error.

In some implementations, when the user requests that the peripheral assistant control device 342 control a function of skipping to the next song in a playlist, the peripheral assistant control device 342 can be assigned one or more other functions associated with the request from the user. For example, in response to processing the audio data corresponding to the spoken utterance, the server device 302 can identify the function that the user is requesting that the peripheral assistant control device 342 be assigned control over. The function can be associated with one or more applications and/or one or more devices, and each application and/or device can exhibit one or more different operating states (i.e., operating modes) at a given time. For instance, an application that performs playback of the songs in the playlist can be in a "playback" state when the application is causing a particular computing device to project music from the playlist. The control device module 324 can identify the state and correlate, via the correlation data 332, the state to the "skip" function that the user is requesting the peripheral assistant control device 342 to have control over. In other words, the control device module 324 will cause the peripheral assistant control device 342 to operate such that, when the application is in the "playback" state, the peripheral assistant control device 342 will perform the "skip" function in response to the user providing a single tap gesture at the user interface 344

Alternatively, or additionally, a function selection engine 330 of the control device module 324 can identify other functions associated with the application, and/or other states of the application. For example, the application can have a "play" function and/or an "on" function, and the application can also have an "off" state and, an "on" and/or "play" state. Based on this information, the control device module 324 can generate correlation data 332 that correlates the on function to the off state of the application, and the skip function to the play state of the application. As a result, and in response to the request from the user, providing a touch input to the user interface 344 of the peripheral assistant control device 242, when the application is in the off state, will cause the application to begin playing music. Furthermore, providing the touch input when the application is in the play state, will cause the application to skip the song that is currently being played. In this way, the peripheral assistant control device 342 will be assigned multiple functions to control, despite the user only requesting that the peripheral assistant control device 242 control a single function. This can eliminate the need for the user to provide additional spoken utterances for requesting that the peripheral assistant control device 342 control multiple other functions. This can save computational resources and/or network resources, because audio data corresponding to the additional spoken utterances would not need to be generated and/or transmitted from the client device 334 to the server device 302. Rather, the peripheral assistant control device 342 can be assigned control over multiple different functions, which the spoken utterance from the user was void of identifying, or otherwise not specifically requested by the user.

In some implementations, the control device module 324 can generate correlation data 332 that correlates one or more functions to be controlled by the peripheral assistant control device 342 with one or more conditions. For instance, the function selection engine 330 can assign control over a particular function according to whether a particular condition is satisfied. The control device module 324 can determine whether a condition is satisfied based on the assistant data 322, the client data 340, and/or any other data that can be transmitted to the client device 334 and/or the server device 302. For example, a particular condition can be satisfied when a first user is determined to be located in definable area that includes the peripheral assistant control device. Therefore, when the first user is determined to be within the definable area, the function selection engine 330 can assign control of a function to the peripheral assistant control device 342, based on the particular condition being satisfied. Alternatively, or additionally, another condition can be satisfied when the peripheral assistant control device 342 is determined to be located within another definable area. Therefore, when the peripheral assistant control device 342 is determined to be within the other definable area, the function selection engine 330 can assign control of another function to the peripheral assistant control device 342 based on the other condition being satisfied.

Figure 4A:
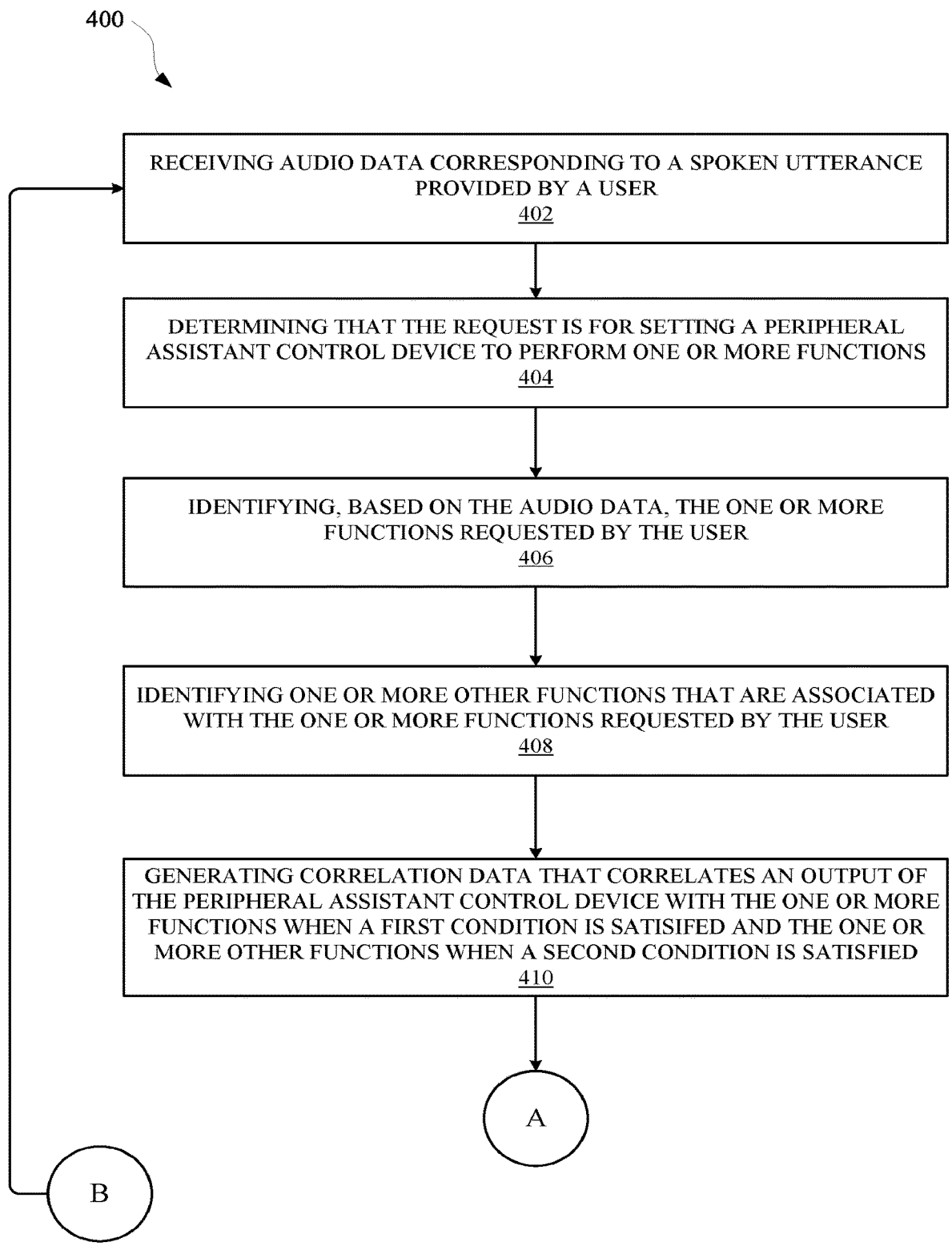
FIG. 4A and FIG. 4B illustrate methods for assigning control of a particular function to a peripheral assistant control device according to whether one or more conditions are satisfied.
Figure 4B:
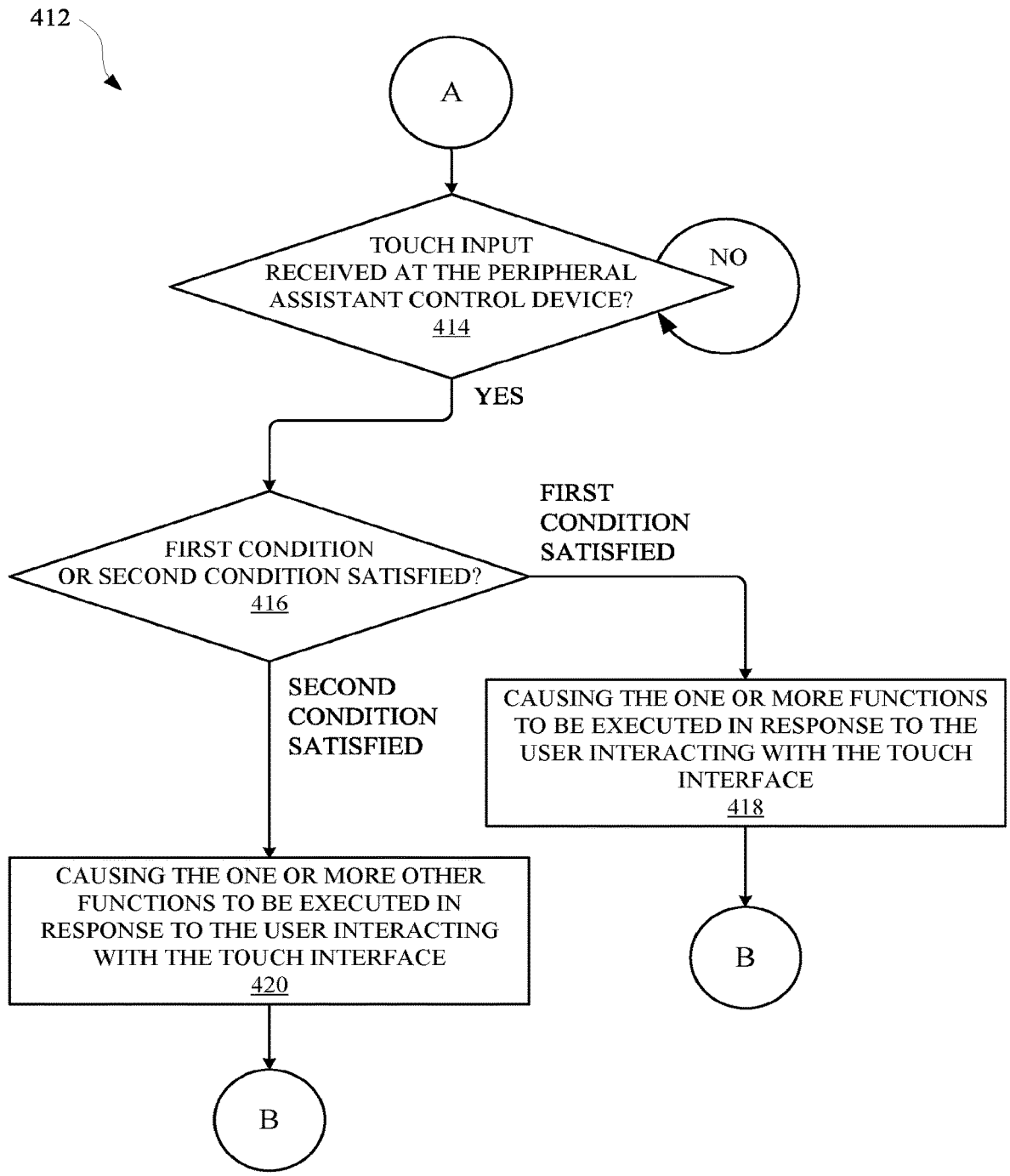

FIG. 4A and FIG. 4B illustrate a method 400 and a method 412 for assigning control of a particular function to a peripheral assistant control device according to whether one or more conditions are satisfied. In some implementations, the method 400 can be performed according to the operations identified in FIG. 4A, with optionally including the operations identified in FIG. 4B. In some implementations, the method 412 can be performed according to operations identified in FIG. 4B with optionally including the operations identified in FIG. 4A. Each method of the method 400 and the method 412 can be performed by one or more devices, one or more applications, and/or any other apparatus or module capable of operating according to a computer process.

The method 400 can include an operation 402 of receiving audio data corresponding to a spoken utterance provided by a user (or other data provided as an input to an application via a modality such as a keyboard, mouse, touch display, and/or any other apparatus for providing input to a computing device). The spoken utterance (or other data) can be a request for an automated assistant to assign control of a first automated assistant function and a second automated assistant function to a peripheral assistant control device. For example, the spoken utterance can be, "Assistant, give me the news when I press the button and play music when my husband presses the button." Alternatively, the spoken utterance can be multiple spoken utterances provided by different users. For instance, a first user in a household can provide a spoken utterance such as, "Assistant when I press the button, play music," and a second user in the household can provide another spoken utterance such as, "Assistant, when I press the button, give me the news."

The method 400 can further include an operation 404 of determining that the request(s) is a request from the user for setting a peripheral assistant control device to perform one or more functions. For example, audio data generated based on the spoken utterance can be processed to identify an identifier for the peripheral assistant control device and one or more functions. Based on at least on the content of the audio data, a determination can be made that the user is requesting that the peripheral assistant control device be assigned control of one or more functions. The method 400 can also include an operation 406 of identifying, based on the audio data, the one or more functions requested by the user. For example, the one or more functions can include a play news function and/or a play music function. In some implementations, the automated assistant can be associated with a number of different functions capable of being performed by the automated assistant, and/or via a separate application or a separate assistant agent.

The method 400 can further include an operation 408 of identifying one or more other functions that are associated with the one or more functions requested by the user. The one or more other functions can be identified based on any data that characterizes an association or correspondence between the one or more functions and the one or more other functions. For example, when the one or more functions correspond to a particular application, other functions associated with that application can be identified via operation 408. Alternatively, or additionally, when the one or more functions correspond to a particular device, other functions associated with that device can be identified via operation 408. Alternatively, or additionally, when a particular user has used the one or more functions previously, and has also used one or more other functions at least as frequently as the one or more functions, the one or more other functions can be identified via operation 408. In this way, despite the user not explicitly identifying the one or more other functions in their spoken utterance—nonetheless, the other functions can be identified for assigning the peripheral assistant control device control over those other functions.

The method 400 further include an operation 410 of generating correlation data that correlates an output of the peripheral assistant control device with the one or more functions when a first condition is satisfied, and the one or more other functions when a second condition is satisfied. In some implementations, the user can characterize the first condition and/or the second condition via a spoken utterance, in order that the user can have exclusive control over when the peripheral assistant control device will be controlling a particular function of one or more functions. Alternatively, or additionally, one or more conditions can be identified without being explicitly requested by the user, in order to adapt the peripheral assistant control device to various contexts in which the automated assistant predicts or anticipates the peripheral assistant control device will be used. For example, when the spoken utterance includes a request from the user for the peripheral assistant control device to control in their kitchen, receipt of the spoken utterance can characterize various conditions that are based on other areas within a home of the user. Specifically, correlation data can be generated that characterizes a first condition, in which control of the kitchen lights by the peripheral assistant control device is based on the peripheral assistant control device being in the kitchen. Additionally, the correlation data can also characterize a second condition in which control of living room lights by the peripheral assistant control device is based on the peripheral assistant control device being in the living room.

The method 400 can proceed from operation 410 to the operation 414, as indicated by continuation element "A," which is illustrated in FIG. 4A and FIG. 4B. The operation 414 includes a determination of whether a touch input has been received at the peripheral assistant control device. The operation 414 can be determined periodically until the user provides a touch input to the peripheral assistant control device. A touch input can be one or more physical gestures, such as a tap, double tap, multi-tap, long press, pull, a rhythm of presses, and/or any other physical gestures that can be received at a user interface. In response to determining that a touch input was received at the peripheral assistant control device, the method 412 can proceed to operation 416.

The operation 416 can include determining whether a first condition or a second condition has been satisfied. Each condition of the first condition and the second condition can be any condition that can be characterized by data stored at a computing device. For instance, the first condition can be satisfied when a user is determined to be located within an area that includes the peripheral assistant control device, and the second condition can be satisfied when a second user is determined to be located within the area that includes the peripheral assistant control device. Alternatively, or additionally, the first condition can be satisfied when the peripheral assistant control device is determined to be located within a first area, and the second condition can be satisfied when the assistant control device is determined to be located in a second area.

When the first condition is satisfied, the method 412 can proceed to the operation 418, which can include causing the one or more functions to be executed in response to the user interacting with the touch interface. When the second condition is satisfied, the method 412 can proceed to the operation 420, which can include causing the one or more other functions to be executed in response to the user interacting with the touch interface. In this way, despite the same touch input being received—regardless of whether the first condition or the second condition is satisfied, this same touch input can cause different results, depending on whether the first condition was satisfied or the second condition was satisfied. This can reduce delays in setting up devices that might otherwise occur if the user had to explicitly request each particular condition and each particular function via a spoken utterance or other interaction with a computing device. By eliminating the need for the user to provide such additional spoken utterances or interactions, computational resources and network resources can be preserved for any computing device that is responsible for establishing settings for the peripheral assistant control device.

Figure 5:
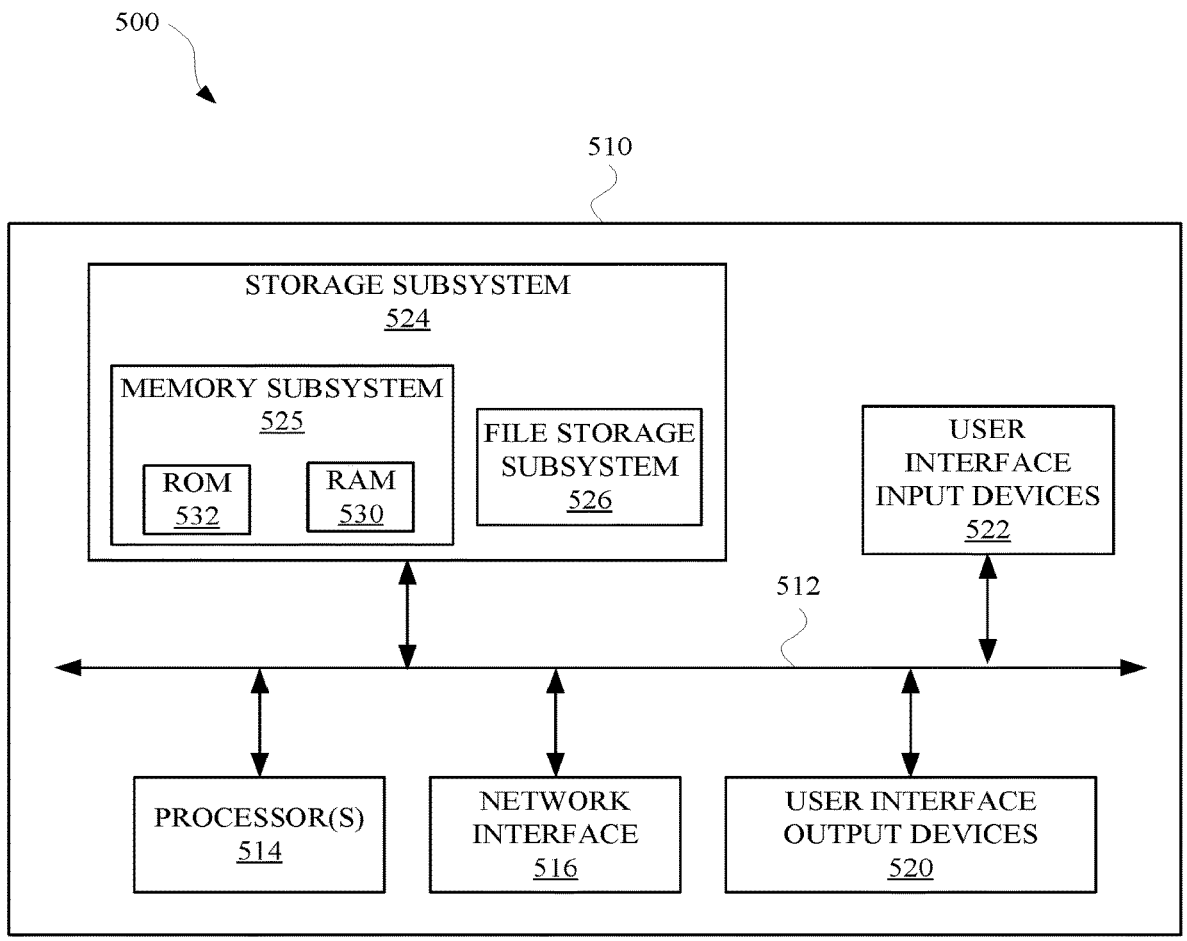
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRD), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, method 412, and/or first client device 110, second client device 114, peripheral assistant control device 112, server device 120, automated assistant 122, first client device 210, second client device 214, peripheral assistant control device 212, server device 220, automated assistant 222, system 300, automated assistant 308, server device 302, control device module 324, client device 334, and/or peripheral assistant control device 342.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a cd-rom drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, zip code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:

assigning a first automated assistant function and a second automated assistant function to a peripheral assistant control device in response to a user providing one or more spoken utterances that identify only the first automated assistant function;

receiving, at a computing device and from the peripheral assistant control device via a wireless communications channel, interaction data that is generated by the peripheral assistant control device in response to a touch input being provided, by the user, at a touch interface of the peripheral assistant control device;

determining, based on data that is accessible via the computing device, a current operating state of an application controlled by the computing device;

in response to receiving the interaction data:
selecting, based on the current operating state and from among at least the first automated assistant function and the second automated assistant function, a particular function, wherein the selecting comprises:
selecting the first automated assistant function as the particular function when the current operating state is a first state, and
selecting the second automated assistant function as the particular function when the current operating state is a second state that is distinct from the first state; and
causing an automated assistant, accessible via the computing device, to execute the particular function.

2. The method of claim 1, wherein the first automated assistant function is also executable in response to a first corresponding spoken request to an automated assistant interface of the computing device, and the second automated assistant function is also executable in response to a second corresponding spoken request to the automated assistant interface of the computing device.

3. The method of claim 1, wherein the touch interface of the peripheral assistant control device includes a touch sensor that is responsive to one or more tactile gestures.

4. The method of claim 3, wherein the peripheral assistant control device provides the interaction data exclusively in response to the interaction with the touch interface, and the touch interface is exclusively responsive to the one or more tactile gestures.

5. The method of claim 1, wherein the application performs playback of songs and wherein the first state is a playback state.

6. The method of claim 5, wherein the first automated assistant function, when executed, causes the application to skip to a next song.

7. The method of claim 6, wherein the second function, when executed, causes the application to begin playback of music.

8. The method of claim 1, wherein the peripheral assistant control device lacks a microphone.

9. The method of claim 8, wherein the peripheral assistant control device lacks a Wi-Fi module.

10. A method implemented by one or more processors, the method comprising:

determining, based on data that is accessible via a computing device, whether a peripheral assistant control device is connected to a first client device or is instead connected to a second client device,
wherein the peripheral assistant control device is in wireless communication with the computing device, and an automated assistant is accessible via the computing device;

receiving, from the peripheral assistant control device, interaction data that is generated in response to a touch interface of the peripheral assistant control device receiving a touch input;

in response to receiving the interaction data:
selecting, based on whether the peripheral assistant control device is connected to the first client device or is instead connected to the second client device and from among at least a first automated assistant function and a second automated assistant function, a particular function, wherein the selecting comprises:
selecting the first automated assistant function as the particular function when the peripheral assistant control device is connected to the first client device, and
selecting the second automated assistant function as the particular function when the peripheral assistant control device is connected to the second client device; and
causing an automated assistant to execute the particular function.

11. The method of claim 10, wherein the first automated assistant function is also executable in response to a first corresponding spoken request to an automated assistant interface of the automated assistant, and the second automated assistant function is also executable in response to a second corresponding spoken request to the automated assistant interface of the automated assistant.

12. The method of claim 10, further comprising:
assigning the first automated assistant function and the second automated assistant function to the peripheral assistant control device in response to the user providing one or more spoken utterances that identify the first automated assistant function and the second automated assistant function.

13. The method of claim 10, wherein the touch interface of the peripheral assistant control device includes a touch sensor that is responsive to one or more tactile gestures.

14. The method of claim 13, wherein the peripheral assistant control device provides the interaction data exclusively in response to the interaction with the touch interface, and the touch interface is exclusively responsive to the one or more tactile gestures.

15. A system comprising:
a computing device;
a peripheral assistant control device that is in communication with the computing device via a wireless communication channel, wherein the peripheral assistant control device includes a touch interface, and wherein the peripheral assistant control device transmits, to the computing device and via the wireless communication channel, interaction data responsive to a touch input at the touch interface;
wherein the computing device includes one or more processors configured to execute instructions to:
assign a first automated assistant function and a second automated assistant function to the peripheral assistant control device in response to one or more spoken utterances that identify only the first automated assistant function;
receive the interaction data via the wireless communication channel;

determine a current operating state of an application controlled by the computing device;

in response to receiving the interaction data:
- select, based on the current operating state and from among at least the first automated assistant function and the second automated assistant function, a particular function, wherein in selecting the current operating state one or more of the processors are to:
  - select the first automated assistant function as the particular function when the current operating state is a first state, and
  - select the second automated assistant function as the particular function when the current operating state is a second state that is distinct from the first state; and
- cause an automated assistant, accessible via the computing device, to execute the particular function.

* * * * *